(12) United States Patent
Chambers et al.

(10) Patent No.: US 8,931,541 B2
(45) Date of Patent: Jan. 13, 2015

(54) MOTORIZED DRIVE UNIT ASSEMBLY FOR A SHADE SYSTEM

(71) Applicant: Lutron Electronics Co., Inc., Coopersburg, PA (US)

(72) Inventors: Samuel F. Chambers, Gwynedd Valley, PA (US); Matthew R. Hontz, Allentown, PA (US); David A. Kirby, Zionsville, PA (US); Daniel W. Mistarz, Allentown, PA (US); Peter W. Ogden, Jr., Breinigsville, PA (US); James J. Wilson, Nazareth, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 13/800,524

(22) Filed: Mar. 13, 2013

(65) Prior Publication Data

US 2013/0240165 A1   Sep. 19, 2013

Related U.S. Application Data

(60) Provisional application No. 61/611,709, filed on Mar. 16, 2012.

(51) Int. Cl.
*A47H 5/00* (2006.01)
*E06B 9/74* (2006.01)
(Continued)

(52) U.S. Cl.
CPC . *E06B 9/74* (2013.01); *F16D 13/08* (2013.01); *A47H 5/0325* (2013.01)
USPC ............................ 160/331; 74/625; 192/41 S (58) Field of Classification Search
USPC ......... 160/331, 188, 310, 311; 74/625, 125.5; 192/41 S, 55.5, 81 C IPC .................................................... A47H 5/0325
See application file for complete search history.

(56) References Cited

U.S. PATENT DOCUMENTS 2,939,329 A *  6/1960  Doerries ................. 74/388 R
4,982,823 A *  1/1991  Yoshida .................... 192/38
(Continued)

FOREIGN PATENT DOCUMENTS

EP    0 972 906    1/2000
EP    2 216 487    8/2010

OTHER PUBLICATIONS

International Patent Application No. PCT/US2013/031283: International Search Report and Written Opinion dated Jul. 29, 2013, 13 pages.

*Primary Examiner* — David Purol
(74) *Attorney, Agent, or Firm* — Condo Roccia Koptiw LLP (57) ABSTRACT

A motor drive unit assembly for a motorized drapery system having a drapery fabric can include a motor having a drive shaft, an output member rotatable about a drive axis, such that rotation of the output member about the drive axis causes the drapery fabric to move, and a clutch member operatively coupled between the drive shaft of the motor and the output member. The clutch member is configured to automatically couple the output member to the drive shaft such that rotation of the motor drive shaft causes the output member to rotate about the drive axis when the motor drives the drive shaft. The clutch member is further configured to automatically decouple the output member from the motor drive shaft so that the output member rotates about the drive axis relative to the motor drive shaft when the output member is manually driven.

41 Claims, 9 Drawing Sheets

(51) Int. Cl.
 *F16D 13/08* (2006.01)
 *A47H 5/032* (2006.01)

(56) References Cited

U.S. PATENT DOCUMENTS

| | | | | |
|---|---|---|---|---|
| 5,990,646 A * | 11/1999 | Kovach et al. | | 318/468 |
| 6,076,592 A * | 6/2000 | Grutzner | | 160/331 |
| 6,695,112 B1 * | 2/2004 | Webber | | 192/35 |
| 6,886,218 B2 | 5/2005 | ter Braak | | |
| 6,935,403 B2 | 8/2005 | Killo et al. | | |
| 6,994,145 B2 | 2/2006 | Killo et al. | | |
| 7,686,063 B2 | 3/2010 | Kirby et al. | | |
| 7,839,109 B2 | 11/2010 | Carmen, Jr. et al. | | |
| 2008/0105390 A1 | 5/2008 | Vrielink | | |
| 2008/0289778 A1 | 11/2008 | Vrielink | | |
| 2010/0122781 A1 | 5/2010 | Charleux et al. | | |
| 2010/0219306 A1 | 9/2010 | Detmer et al. | | |
| 2012/0048673 A1* | 3/2012 | Mellor | | 192/41 S |
| 2012/0261078 A1 | 10/2012 | Adams et al. | | |

* cited by examiner

MOTORIZED DRIVE UNIT ASSEMBLY FOR A SHADE SYSTEM

CROSS REFERENCE TO RELATED APPLICATIONS

This application claims priority to U.S. Provisional Application No. 61/611,709, filed Mar. 16, 2012, the contents of which are hereby incorporated by reference in its entirety herein.

BACKGROUND

Motorized drapery systems allow for movement of a suspended drapery fabric covering, for example, a window or other opening. Typical motorized drapery systems include a drive system having a reversible motor that turns a drive pulley for moving a drive belt within an elongated track. The drive belt is connected to a master car to provide for movement of the master car in two opposite directions depending on the direction that the reversible motor is driving the drive belt. The drapery fabric is attached to the master car and a plurality of auxiliary cars that do not engage the drive belt. The master car and auxiliary cars include wheels received within the track to provide rolling movement of the cars. An elongated slot is provided in the track for connection between the cars positioned within the track and suspended drapery fabric.

Since the master car is fixedly connected to the drive belt, the drapery fabric can only be opened and closed by the drive system. Some prior art drapery systems have allowed a user to decouple the drapery fabric, such that a user is able to manually adjust the position of the drapery fabric (i.e., by gripping and pulling the drapery fabric). However, these systems either require multiple tracks for the master car and the auxiliary cars or require master cars of a large physical size, which prevents the drapery system from being used with all types of drapery fabrics, such as split-draw and ripple-fold draperies. Another prior art drapery system includes a single track and a low profile master car that can be used with split draw and ripple-fold draperies and has a snap mechanism for allowing the master car to be decoupled from the drive system when the user pulls on the drapery fabric, as described in commonly-assigned U.S. Pat. No. 7,686,063, issued Mar. 30, 2010, entitled MOTORIZED DRAPERY SYSTEM HAVING A PULL-AWAY MASTER CAR, the entire disclosure of which is hereby incorporated by reference.

SUMMARY

As described herein, a motor drive unit for a motorized drapery system having a drapery fabric comprises a motor having an output shaft, an output member adapted to be coupled such that rotations of the output member result in movements of the drapery fabric. The output shaft of the motor is only engaged with the output member when the motor is rotating, and is not engaged with the output member when the motor is not rotating. The motor drive unit can further comprise a clutch assembly operatively coupled between the output shaft of the motor and the output member. If the drapery fabric is manually driven, the clutch assembly allows the output member to rotate freely with respect to the output shaft of the motor.

In accordance with one embodiment, a motor drive unit assembly for a motorized shade system having a covering material can include an output member rotatable about a drive axis that extends along a first direction, such that rotation of the output member about the drive axis causes the covering material to move. The assembly can further include a drag cup including a body, the drag cup defining a channel that extends into the body along the first direction. The assembly can also include an input member that is disposed within the channel of the drag cup, the input member having a base that is configured to couple to a motor drive shaft and a body that extends from the base along the first direction, the body including at least one sidewall that defines a channel. Additionally, the assembly can include a mandrel coupled to the output member and disposed within the channel of the input member body and at least one spring disposed about the mandrel. Manual actuation of the output member causes the mandrel to rotate about the drive axis relative to the at least one spring such that the output member is disengaged from the motor drive shaft. Actuation of the motor drive shaft by a motor causes the input member to rotate relative to the drag cup such that the input member engages the at least one spring to cause the at least one spring to tighten about the mandrel to thereby impart rotation of the motor drive shaft to the output member.

In another embodiment, a motor drive unit assembly for a motorized drapery system having a drapery fabric can include a motor having a drive shaft, an output member rotatable about a drive axis, such that rotation of the output member about the drive axis causes the drapery fabric to move, and a clutch member operatively coupled between the drive shaft of the motor and the output member. The clutch member is configured to automatically couple the output member to the drive shaft such that rotation of the motor drive shaft causes the output member to rotate about the drive axis when the motor drives the drive shaft. The clutch member is further configured to automatically decouple the output member from the motor drive shaft so that the output member rotates about the drive axis relative to the motor drive shaft when the output member is manually driven.

In another embodiment, a method of moving covering material of a motorized shade system can include a step of manually rotating an output member about a drive axis, to thereby cause the drapery fabric to move. The method can also include a step of actuating a motor to rotate a motor drive shaft that is coupled to an input member, such that rotation of the input member causes at least one spring to tighten about a mandrel, automatically coupling the motor drive shaft to the output member so that the output member rotates along with the motor drive shaft and causes the drapery fabric to move. The method can further include a step of stopping actuating the motor such that the at least one spring loosens about the mandrel, automatically decoupling the motor drive shaft to the output member so that the output member can be manually rotated.

In another embodiment, a motor drive unit assembly for a motorized shade system having a covering material can include an output member rotatable about a drive axis that extends along a first direction, such that rotation of the output member about the drive axis causes the covering material to move and a motor having a drive shaft that rotates about the drive axis. The assembly can further include an input member having a base that is configured to couple to a motor drive shaft and a body that extends from the base along the first direction, the body including at least one sidewall that defines a channel and at least one recess that extends through the at least one sidewall along a second direction that is transverse to the first direction. The assembly can also include a mandrel coupled to the output member and configured to rotate about the drive axis, the mandrel being disposed within the channel of the input member body. Additionally, the assembly can include at least one spring disposed about the mandrel, the at least one spring having a first configuration whereby the mandrel is rotatable relative to the at least one spring and a second configuration whereby the spring is tightened about the mandrel so as to couple the drive shaft of the motor to the output member.

BRIEF DESCRIPTION OF THE DRAWINGS

The foregoing summary, as well as the following detailed description of embodiments of the application, will be better understood when read in conjunction with the appended drawings. For the purposes of illustrating the methods and systems of the present application, there is shown in the drawings preferred embodiments. It should be understood, however, that the application is not limited to the precise methods and systems shown. In the drawings.

DETAILED DESCRIPTION

Certain terminology is used in the following description for convenience only and is not limiting. The words "right", "left", "lower", "upper", "top", or "bottom" designate directions in the drawings to which reference is made. The words "proximally" and "distally" refer to directions toward and away from, respectively, the individual operating the display unit. The terminology includes the above-listed words, derivatives thereof and words of similar import.

Figure 1:
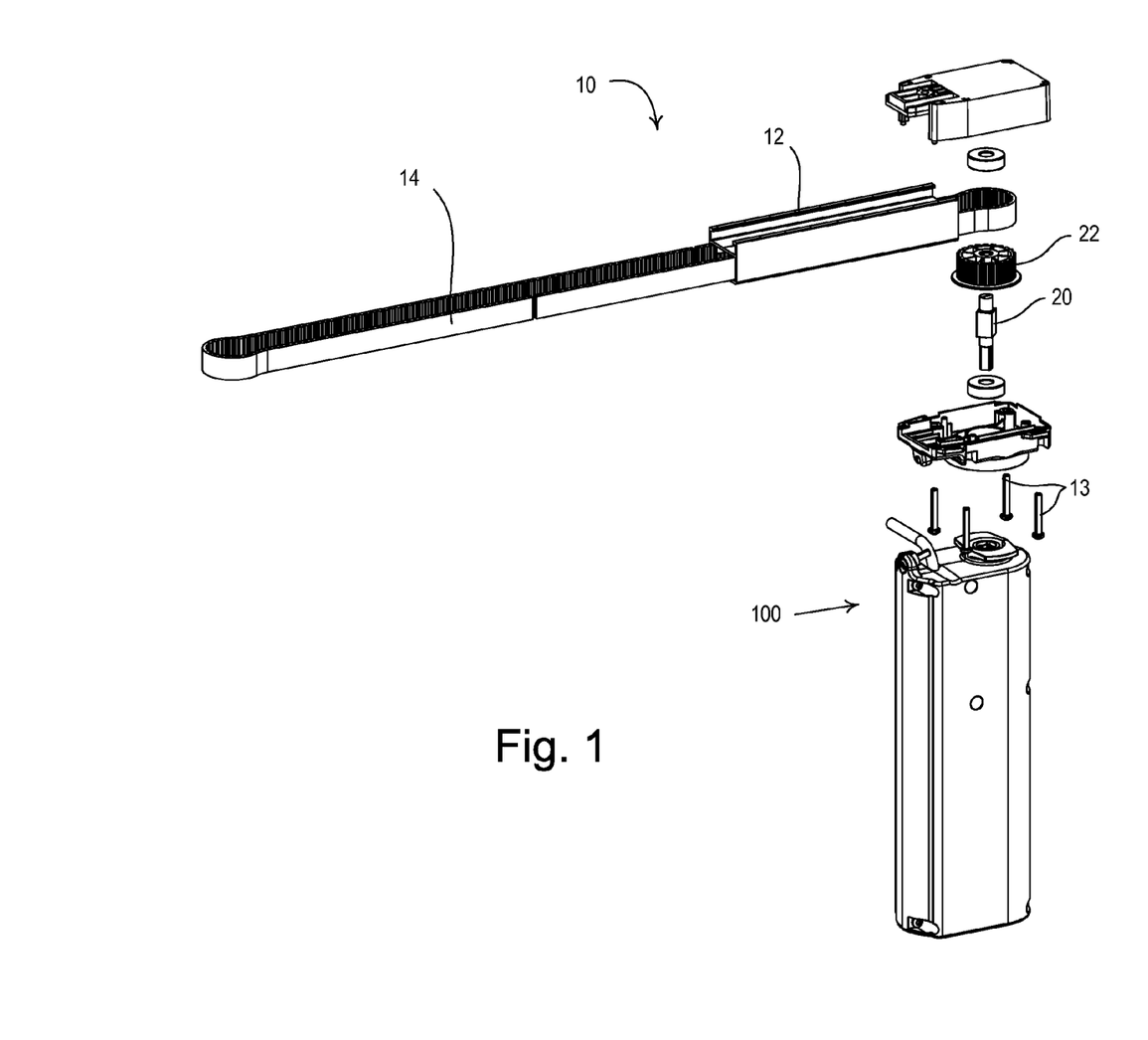
FIG. 1 is an exploded perspective view of a motorized drapery system in accordance with an embodiment, the system including an elongate track, a belt disposed within the elongate track, and a motor drive unit assembly coupled to the belt and configured to rotate the belt within the elongate track.
Figure 2:
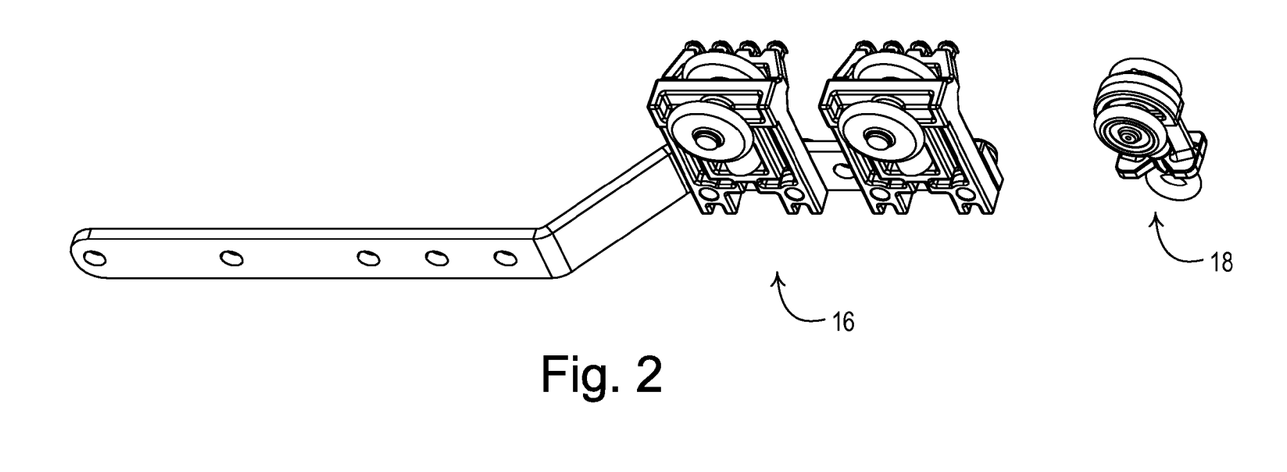
FIG. 2 is a perspective view of a master car and an auxiliary car configured to be disposed within the elongate track shown in FIG. 1, the master car also being configured to be coupled to the belt.
Figure 3:
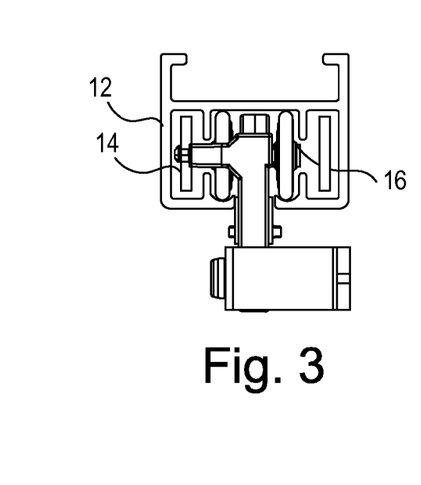
FIG. 3 is a side elevation view of the master car shown in FIG. 2 coupled to the belt shown in FIG. 1.

Referring to FIGS. 1-3, a motorized shade system, illustrated as a motorized drapery system 10, can include an elongate track 12 that is configured to be coupled to or otherwise mounted to a structure, such as a window frame, wall, ceiling, or other structure as desired, a belt 14 rotatably mounted within the track 12, and a motor drive unit assembly 100 coupled to the track 12, for example, by screws 13 and configured to drive the belt 14. As shown in FIGS. 2 and 3, the motorized drapery system 10 can further include a master car 16 configured to couple to the belt 14 within the elongate track 12 so as move along with the belt 14 within the elongate track 12, and a plurality of auxiliary cars 18 coupled to the master car 16 and also disposed within the elongate track 12. The motorized drapery system 10 can further include a covering material such as a drapery fabric that is coupled to each of the master and auxiliary cars 16 and 18 such that the drapery fabric moves along with the cars 16 and 18 between a closed position and an open position. The motor drive unit assembly 100 can be operatively coupled to the belt 14 such that the belt 14 can be moved either manually by an individual or by the motor drive unit assembly 100.

With continuing reference to FIGS. 1-3, the motorized drapery system 10 can further include a shaft 20 that is coupled to the motor drive unit assembly 100 and a belt gear 22 that is mounted on the shaft 20 and is in meshed communication with the belt 14, such that actuation by the motor drive unit assembly 100 rotates the shaft 20, the belt gear 22, and the belt 14, so as to laterally move the master car 16 along the track 12. The auxiliary cars 18 are coupled to the master car 16 such that the auxiliary cars 18 laterally move within the track 12 along with the master car 16. The lateral movement of the master and auxiliary cars 16 and 18 moves the drapery fabric attached to the master and auxiliary cars 16 and 18. An example of the drapery track of the motorized drapery system is shown and described in commonly-assigned U.S. Pat. No. 6,994,145, issued Feb. 7, 2006, entitled MOTORIZED DRAPERY PULL SYSTEM, the entire disclosure of which is hereby incorporated by reference. It should be appreciated, that the motorized shade system 10 is not limited to a motorized drapery system as illustrated, and that the features of the invention described can be incorporated into any kind of motorized shade system as desired.

Figure 4:
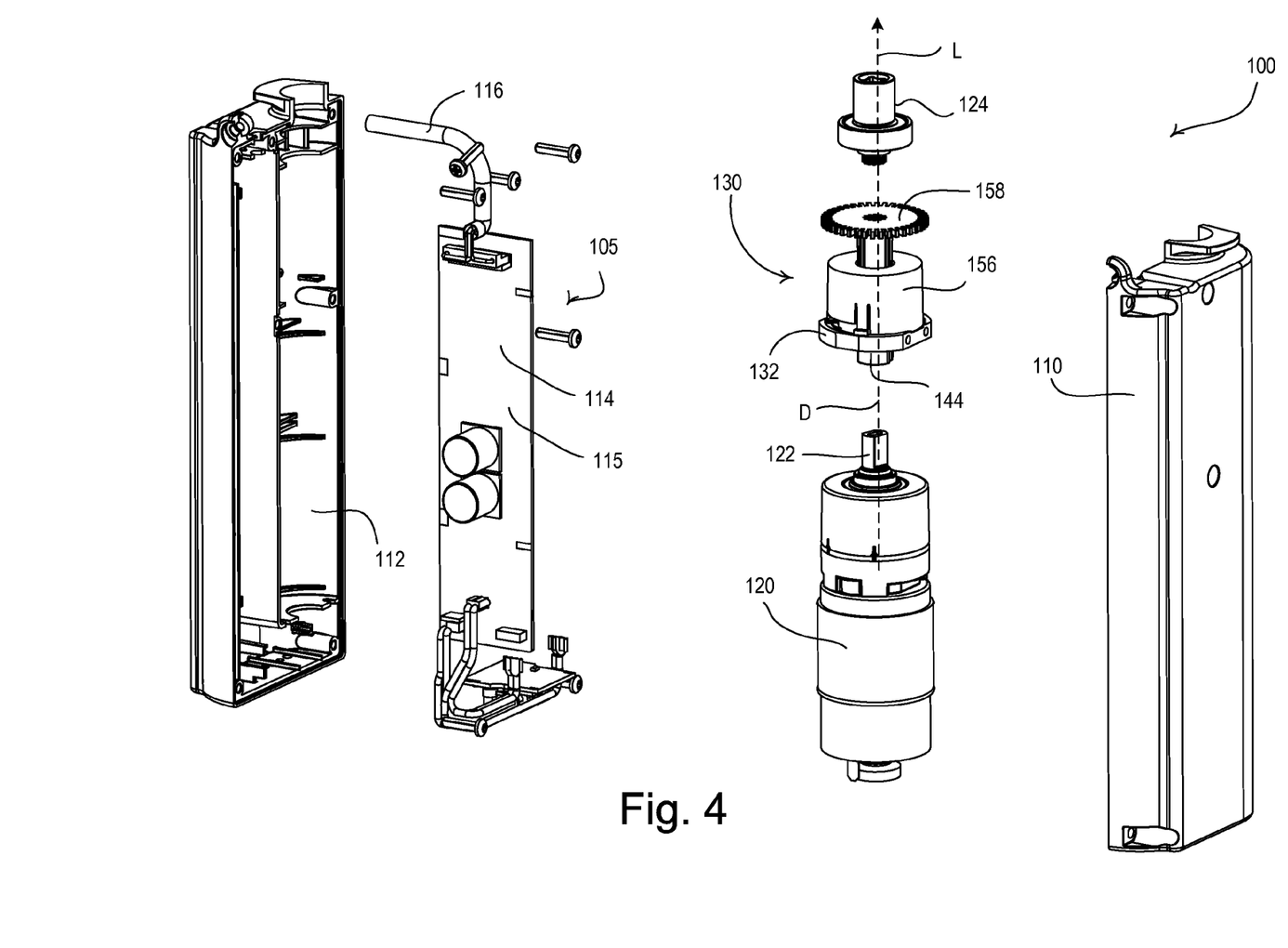
FIG. 4 is an exploded perspective view of the motor drive unit assembly shown in FIG. 1, the assembly including a housing, a printed circuit board mounted within the housing, a motor coupled to the printed circuit board and a clutch assembly operatively coupled to the motor and to an output member that is coupled to the belt shown in FIG. 1.

Referring now to FIG. 4, the motor drive unit assembly 100 can include an output member 124, a motor 120 having a motor drive shaft 122 and a clutch assembly 130 that operatively couples the drive shaft 122 to the output member 124. The motor 120 is configured to rotate the drive shaft 122 about a drive axis D that extends along a first direction L. The output member 124 is coupled to the shaft 20, such that actuation of the motor 120 actuates the drive belt 14. In this way, the motor 120 can drive the belt 14 and move the drapery fabric between the open and closed positions. The clutch assembly 130 is coupled between the motor drive shaft 122 and the output member 124 such that, actuation of the motor drive shaft 122 by the motor 120 causes the clutch assembly to automatically couple the motor drive shaft 122 to the output member 124. Further, when the motor drive shaft 122 is not actuated by the motor 120, the clutch assembly 130 automatically decouples the motor drive shaft 122 from the output member 124, such that the output member 124 can be manually rotated by the user so as to manually move the drapery fabric between the open and closed positions. Therefore, the clutch assembly 130 allows the drapery fabric to be moved either manually or by the motor 120 without intermediate coupling steps having to be performed by the user moving the drapery fabric.

With continued reference to FIG. 4, the motor drive unit assembly 100 can further include a rotary encoder 158 coupled to the output member 124. The rotary encoder 158 is configured to function as a rotational position sensor that monitors the position of the drapery fabric. An example of a motorized window treatment having a rotational position sensor is described in greater detail in commonly-assigned U.S. patent application Ser. No. 13/415,084, filed Mar. 8, 2012, entitled MOTORIZED WINDOW TREATMENT, the entire disclosure of which is hereby incorporated by reference. As shown in FIG. 4, the motor drive unit assembly 100 can further include housing portions 110 and 112 that enclose the motor 120, the motor drive shaft 122, the clutch assembly 130, the rotary encoder 158, and the output member 124. The housing portions 110 and 112 can also enclose other components of the motor drive unit assembly 100 such as an electrical circuit 115 including a controller and a motor drive circuit for driving the motor 120, and a transmissive optical sensor circuit that are each mounted on a printed circuit board 114 and receive power from an electrical cord 116. The rotary encoder 158, along with the printed circuit board 114 and electrical cord 116 can be part of a control system 105 of the motor drive unit assembly 100. When the electric circuit 115 receives power from the electrical cord 116, the controller receives an input from the rotary encoder 158 indicating the position of the fabric of the motorized drapery system 10 via the transmissive optical sensor circuit and subsequently controls actuation of the motor 120 via the motor drive circuit. An example of an electrical circuit for driving the motor 120 is described in greater detail in commonly-assigned U.S. Pat. No. 7,839,109, issued Nov. 23, 2010, entitled METHOD OF CONTROLLING A MOTORIZED WINDOW TREATMENT, the entire disclosure of which is hereby incorporated by reference.

Figure 5:
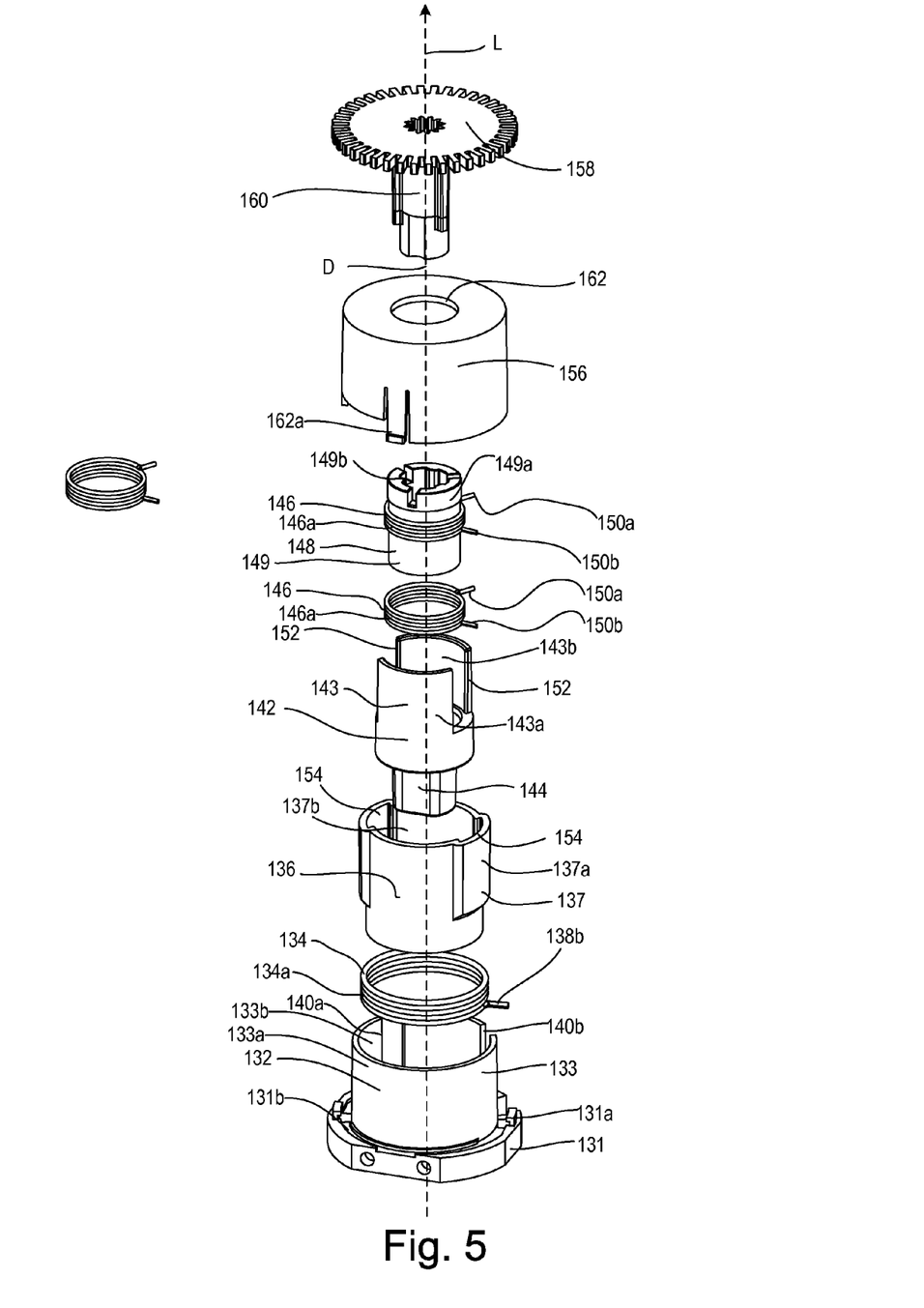
FIG. 5 is an exploded perspective view of the clutch assembly and rotary encoder shown in FIG. 4, the clutch assembly including a housing, a static cup mounted within the housing, a drag cup disposed within the static cup, an input member disposed within the drag cup and configured to mount to the motor output shown in FIG. 4, and a mandrel disposed within the input member.

Now in reference to FIG. 5, the clutch assembly 130 can include a static cup 132 that is configured to be fixedly attached to the motor 120 and a cover 156 that can be removably attached to the static cup 132 to thereby enclose other components of the clutch assembly 130. That is, the clutch assembly 130 can further include a drag cup 136 rotatably disposed within the static cup 132, an input member 142 rotatably disposed within the drag cup 136, a mandrel 148 rotatably disposed within the input member 142, and at least one first spring 146 (e.g. a drive spring) disposed about the mandrel 148 and within the input member 142. Rotation of the drive shaft 122 by the motor 120 causes the drag cup 136, the input member 142, and the mandrel 148 to rotate relative to the static cup 132. And, rotation of the input member 142 and the drag cup 136 causes the at least one spring 146 to tighten about the mandrel 148 to thereby automatically couple the drive shaft 122 to the output member 124.

With continued reference to FIG. 5, the static cup 132 is fixed relative to the motor 120. As shown, the static cup includes a base 131 and a body 133 that extends from the base 131 along the first direction L. As shown, the body 133 has at least one sidewall 133a that defines a channel 133b that is sized to receive the drag cup 136 such that the drag cup 136 is rotatable about the axis D within the channel 133b. In particular, the channel 133b receives the drag cup 136 such that friction between the static cup 132 and the drag cup 136 causes the drag cup 136 to initially rotate at an angular velocity that is slower than that of the input member 142 when the drive shaft 122 is being driven by the motor 120. In the illustrated embodiment, the body 133 includes a single sidewall 133a that is cylindrically shaped. It should be appreciated, however, that the body 133 can have any number of sidewalls 133a as desired, so long as the sidewalls define a channel that can receive the drag cup 136.

The base 131 can include clips 131a that are configured to mate with clips 156a of the cover 156. The base 131 can further define an annular recess 131b that is configured to receive a portion of the cover 156 when the cover 156 is attached to the static cup 132. It should be appreciate, however, that the base 131 can include any features that are capable of attaching the cover 156 to the static cup 132.

The static cup body 133 can define at least one recess 140, such as first and second recesses 140a and 140b that extend into the at least one sidewall 133a along a direction that is transverse to the first direction L. As shown, the first and second recesses 140a and 140b can extend completely through the at least one sidewall 133a. It should be appreciated, however, that the first and second recesses 140a and 140b can extend only partially through the at least one sidewall 133a as desired. It should be further appreciated, that the static cup body 133 can define any number of recesses 140 as desired.

The static cup 132 can further include at least one second spring 134 (e.g. a drag spring) that is disposed about the drag cup 136. Friction between the drag cup 136 and the at least one drag spring 134 causes the drag cup 136 to initially rotate at a slower angular velocity than that of the input member 142 when the drive shaft 122 is driven by the motor 120. The drag spring 134 can have an annular portion 134a that is tightly wrapped around the drag cup 136 within the channel 133b and is centered about axis D. The drag spring 134 can further have at least one tang 138, such as a first tang 138a and a second tang 138b, that each extends radially outward from the annular portion 134a, away from axis D. Each tang 138a and 138b is configured to extend into a respective one of the first and second recesses 140a and 140b such that actuation of the motor drive shaft 122 by the motor causes the tangs 138a and 138b to engage the at least one sidewall 133a to thereby expand the annular portion 134a so as to allow the drag cup 136 to rotate relative to the drag spring 134 while still maintaining friction between the drag spring 134 and the drag cup 136. It should be appreciated, that the drag spring 134 can include any number of tangs 138 as desired. It should be further appreciated, that friction can be created between the drag cup 136 and the static cup 132 with grease rather than the drag spring 134 or through a combination of grease and drag springs. Therefore it should be appreciated, that any mechanism may be utilized to slow the angular velocity of the drag cup 136 relative to that of the input member 142.

With continued reference to FIG. 5, the drag cup 136 is disposed within and contacts the annular portion 134a of the drag spring 134. The drag cup 136 includes a body 137 and a channel 137b that extends into the body 137 along the first direction L. In particular, the body 137 can include at least one sidewall 137a that defines the channel 137b. The channel 137b is configured to receive the input member 142 such that the input member 142 is at least partially rotatable with respect to the drag cup 136. The drag cup 136 can further include at least one recess 154, such as two recesses 154 as illustrated, that extend into the body 137 from the channel 137b along a direction that is transverse to the first direction. The at least one recess 154 can be defined as an opening in the sidewall such that the recess 154 extends into but not through the sidewall 137a. It should be appreciated, however, that the recesses 154 can extend completely through the sidewall 137a as desired. Further, it should be appreciated, that the body 137 can define any number of sidewalls 137a as desired and can include any number of recesses 154 as desired.

With continued reference to FIG. 5, the input member 142 is disposed within the channel 137b of the drag cup 136. The input member 142 includes a base 144 that extends through the drag cup and through the base 131 of the static cup 132 such that the base 144 can couple to the drive shaft 122 of the motor 120. Therefore, the motor 120 is configured to drive the input member 142 directly. As shown in FIG. 5, the base 144 can define a recess 144a configured to receive the motor drive shaft 122 to thereby couple the input member 142 to the drive shaft 122. It should be appreciated, however, that the base 144 can include any feature configured to couple to the drive shaft 122 as desired.

As shown in FIG. 5, the input member 142 can further include a body 143 that extends from the base 144 along the first direction L. The body 143 can include at least one sidewall 143a that defines a channel 143b. The body 143 can further include at least one recess 152, such as two recesses 152, that extends through the sidewall 143a along a direction that is transverse the first direction L such that the at least one recess 152 of the input member 142 at least partially aligns with the at least one recess 154 of the drag cup 136. In the illustrated embodiment, each recess 152 is at least partially aligned with a respective recess 154 of the drag cup 136. It should be appreciated, however, that the input member 142 can have any number of recesses 154 as desired.

With continued reference to FIG. 5, the mandrel 148 is rotatably disposed within the channel 143b of the input member 142. The mandrel 148 includes a body 149 that can have a substantially cylindrical portion centered about axis D and a lip 149a that extends radially outward from the substantially cylindrical portion of the body 149 such that the radius of the lip 149a in relation to the axis D is greater than that of the annular portion 146a of the drive springs 146. The mandrel 148 further defines a recess 149b that extends into the body 149 along the first direction L. The recess 149b is configured to receive a base of the rotatory encoder 158 and is configured to fit a base 160 of the rotary encoder 158. It should be appreciated, however, that the mandrel 148 can have any shape as desired, can be directly coupled to the output member 124 as desired, and/or can have any structure capable of coupling either the rotary encoder 158 or output member 124 to the mandrel 148.

As shown in FIG. 5, the drive springs 146 can each be disposed about the mandrel 148 and are configured to have a first configuration whereby the mandrel 148 is rotatable relative to the drive springs 146 and a second configuration whereby the drive springs 146 are tightened about the mandrel 148 so as to couple the drive shaft 122 of the motor 120 to the output member 124. Each drive spring 146 includes an annular portion 146a that is sized to receive the mandrel 148 within the channel 43b. Each drive spring 146 further includes at least two tangs, such as a first tang 150a and a second tang 150b, that extend radially outward from the annular portion 146a, away from the axis D. The tangs 150a and 150b are each configured to extend through one of the recesses 152 of the input member 142 and into one of the recesses 154 of the drag cup 136 such that rotation of the input member 142 relative to the drag cup 136 causes the first and second tangs 150a and 150b to move toward each other and tighten the annular portion 146a about the mandrel 148. Specifically, as shown in FIGS. 6B-D, 7B, and 7C, one set of tangs 150a and 150b can disposed is a first set of recesses 152 and 154 and another set of tangs 150a and 150b can be disposed in a second set of recesses 152 and 154 such that rotation of the input member 142 relative to the drag cup 136 causes each first tang 150a to move toward its respective second tang 150b. Therefore, manual actuation of the output member 124 causes the mandrel 148 to rotate about the drive axis D relative to the drive springs 146 such that the output member 124 is disengaged from the motor drive shaft 122 and actuation of the motor drive shaft 122 by the motor 120 causes the input member 142 to rotate relative to the drag cup such that the input member 142 engages the drive springs 146 so as to tighten the drive springs 146 about the mandrel 148 and impart the rotation of the drive shaft 122 to the output member 124.

Now in reference to FIGS. 6C, 6D, 7B, and 7C, the motor 120 can be configured to actuate the drive shaft 122 either clockwise or counterclockwise about the drive axis D to thereby move the fabric of the motorized drapery system 10 between the opened and closed positions, respectively. When the motor 120 is actuating the drive shaft 122 in the clockwise direction, the motor drive shaft 122 rotates the input member 142 clockwise about the axis D. As the sidewall 143a of the input member 142 rotates about axis D, the recess 152 also rotates relative to the tangs 150a and 150b of the drive springs 146 and the sidewall 143a contacts the first tangs 150a so as to rotate the drive springs 146 in the clockwise direction. As each drive spring 146 rotates about axis D, the second tangs 150b rotate within the recesses 154 of the drag cup 136 and abut the sidewall 137a of the drag cup 136. Because the drag cup 136 initially moves at a slower angular velocity than that of the input member 142 the first tangs 150a and second tangs 150b compress toward each other and tighten the drive springs 146 about the mandrel 148 to thereby impart the rotation of the drive shaft 122 to the output member 124.

In that regard, the drag spring 134 creates a frictional force between the drag spring 134 and the drag cup 136 to thereby slow the angular velocity of the drag cup 136 relative to the input member 142. Specifically, since the drag cup 136 is disposed within and contacts the drag spring 134, and the drag spring 134 is held in place relative to static cup 132, the rotational force applied to the drag cup 136 by the second tangs 150b is initially resisted by the drag cup 136 such that a counterclockwise force is applied to the second tangs 150b while a clockwise force is applied to the first tangs 150a. The counterclockwise force against the second tangs 150b combines with the clockwise force against the first tangs 150a to thereby squeeze the respective tangs 150a and 150b together to coil and tighten the drive springs 146 about the mandrel 148. In this way, the output member 124 can be automatically coupled to the drive shaft 122 of the motor 120. Once the output member 124 and the motor drive shaft 122 are coupled, the first tangs 150a and the second tangs 150b continue to rotate about axis D at a relatively similar angular velocity, such that while the motor 120 actuates, the spring 146 remains in its tightened position about the mandrel 148 (see e.g. FIGS. 6D and 7C). Accordingly, as the motor drive shaft 122 rotates, the drive springs 146 coil and tighten about the mandrel 148 such that rotation of the drive shaft 122 causes rotation of the mandrel 148, which in turn causes rotation of the rotary encoder 158 and the output shaft 124 (and belt 14).

The first recess 140a of the static cup 132 and the drag spring 134 can be configured such that the drag spring 134 loosens slightly as the drag cup 136 rotates. For example, as the drag cup 136 rotates about axis D, the drag spring 134 (which is in contact with the drag cup) also rotates. The first tang 138a, which is disposed within the first recess 140a of the static cup 132, can rotate so as to abut the static cup sidewall 133a. The static cup sidewall 133a can prevent further rotation of the first tang 138a, while the remainder of drag spring 134 continues to rotate, causing the spring to uncoil slightly and loosen about the drag cup 136. As drag spring 134 rotates, the second tang 138b (disposed within the second recess 140b) can also abut the static cup sidewall 133a, preventing further rotation and uncoiling of drag spring 134. In this way, the drag spring 134 can work in conjunction with the drive springs 146 so that the second tang 150b of the drive spring 146 rotates at a similar angular velocity to the first tang 150a once the drive spring 146 is in its tightened position about the mandrel 148.

While the drag spring 134 is shown in relation to the figures as creating the drag force on drag cup 136, other materials and structures can be employed. For example, grease can be disposed within static cup 132 and around drag cup 136 so as to resist the angular force on the drag cup 136 imposed by the drive springs 146. Further, other embodiments can have other structure that initially creates a relative difference in the angular velocities of the first and second tangs 150a and 150b without the use of the static cup 132 and the drag cup 136. For example, a different damper device can be employed to resist the rotational movement of either the first tang 150 a or second tang 150b.

Figure 6A:
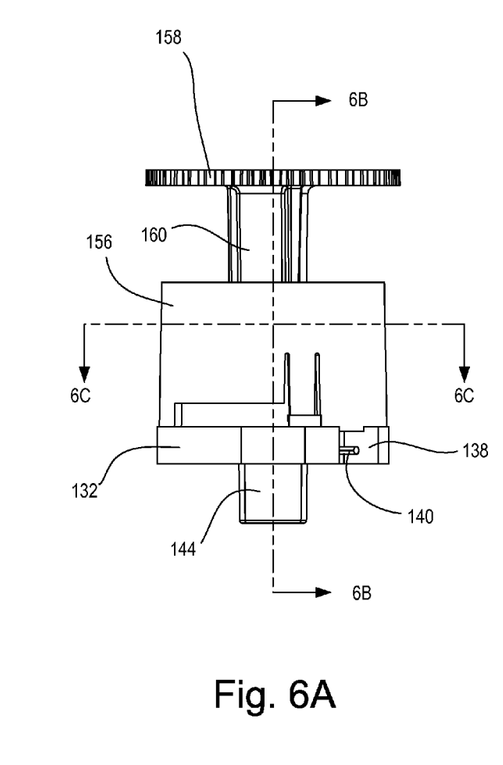
FIG. 6A is a side elevation view of the clutch assembly and rotary encoder shown in FIGS. 4 and 5.
Figure 6B:
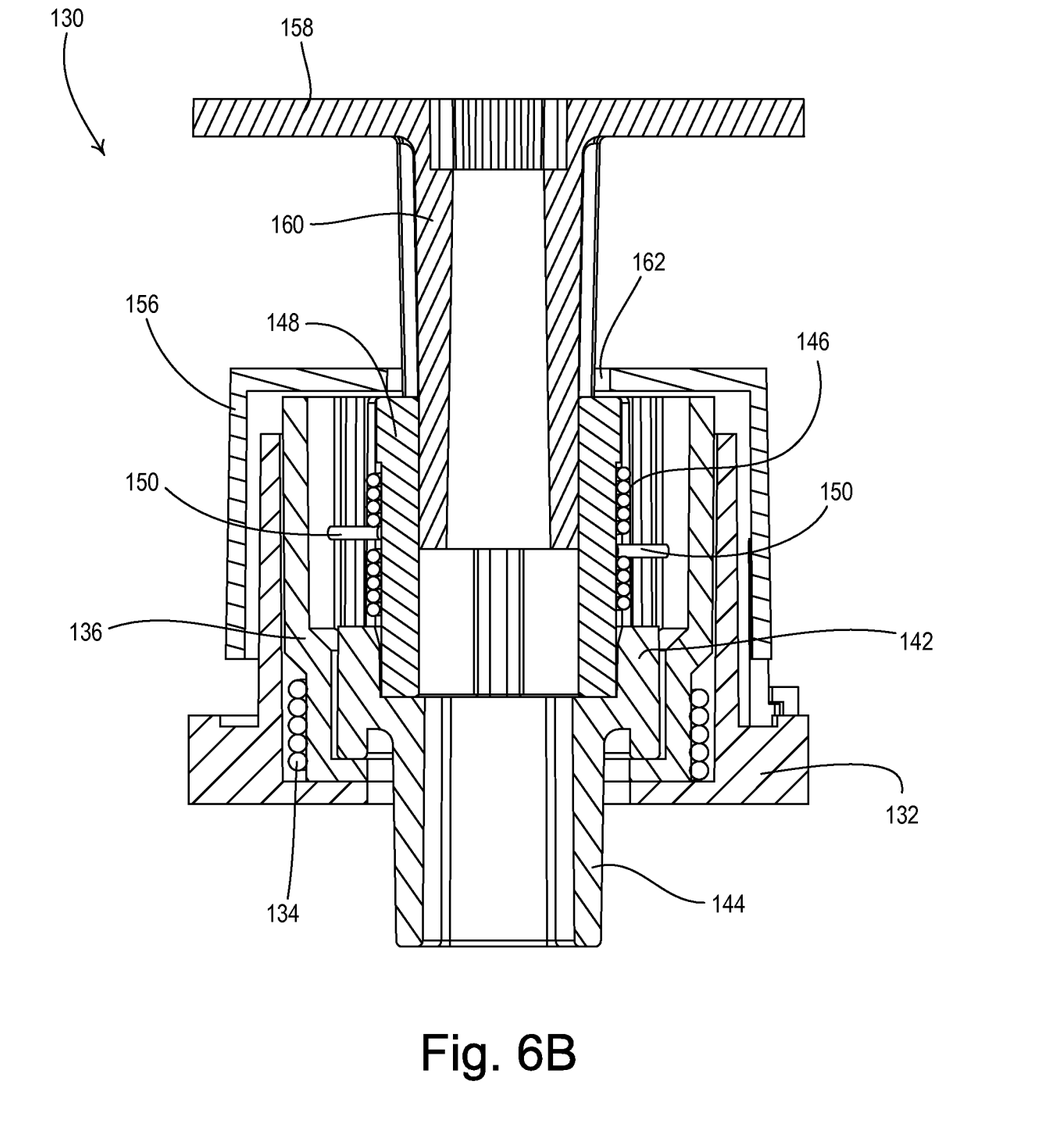
FIG. 6B is a cross-sectional view of the clutch assembly shown in FIG. 6A through the line 6B-6B.
Figure 6C:
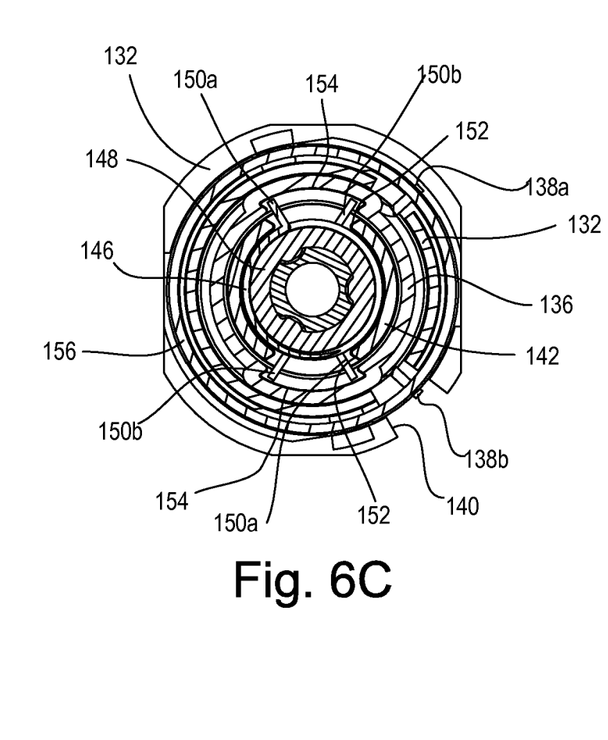
FIG. 6C is a cross-sectional view of the clutch assembly shown in FIG. 6A through the line 6C-6C depicting a configuration of the clutch assembly when the motor is in an idle state.
Figure 6D:
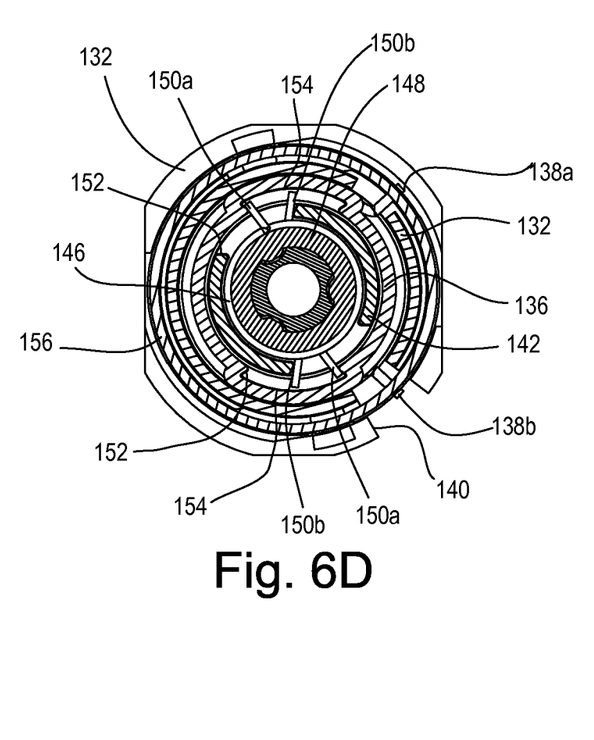
FIG. 6D is a cross-sectional side view of the clutch assembly shown in FIG. 6A through the line 6C-6C depicting a configuration of the clutch assembly when the motor is in driven state.
Figure 7A:
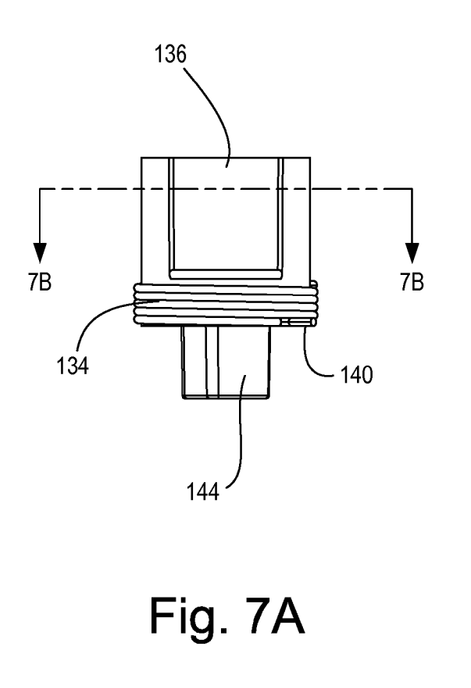
FIG. 7A is a side elevation view of the drag cup and the input member, shown in FIG. 5.
Figure 7B:
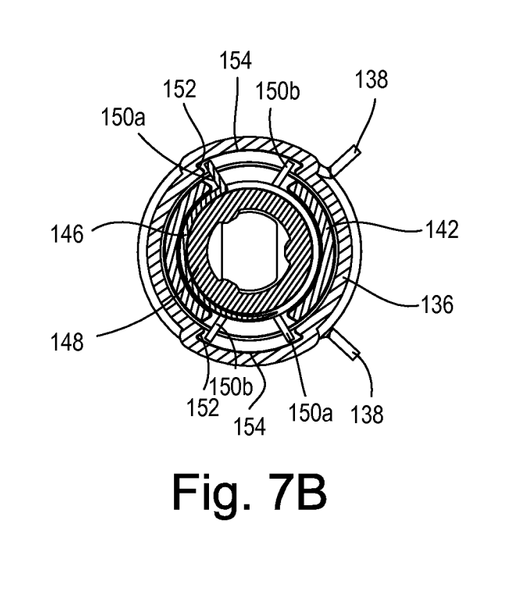
FIG. 7B is a cross-sectional view of the drag cup and the input member, shown in FIG. 7A through the line 7B-7B depicting a configuration of the clutch assembly when the motor is in an idle state.
Figure 7C:
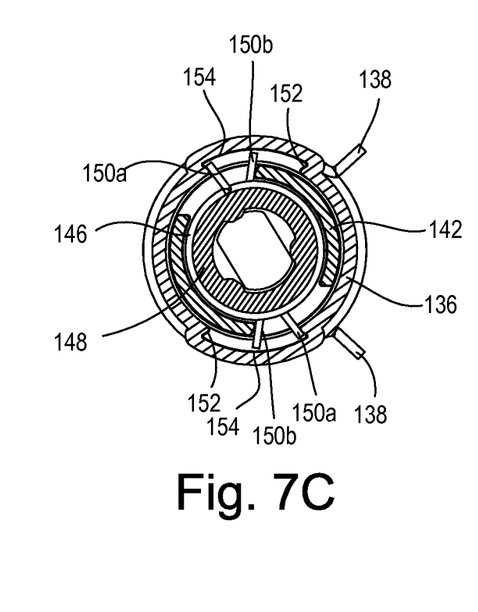
FIG. 7C is a cross-sectional view of the drag cup, the input member, and the mandrel shown in FIG. 7A through the line 7B-7B depicting a configuration of the clutch assembly when the motor is in a driven state.

As shown in FIGS. 6C and 7B, when the motor 120 ceases clockwise actuation of the motor drive shaft 122, the input member 142 and the drag cup 136 stop applying clockwise and counterclockwise forces to the tangs 150a and 150b of drive springs 146, respectively. The drive springs 146 thus lose their potential energy and loosen from the mandrel such that the motor drive shaft 122 is automatically decoupled from the output member 124 when the motor 120 ceases.

In order to drive the fabric in the opposite direction, the motor 120 is actuated, and the motor drive shaft 122 rotates the input member 142 about axis D in the counterclockwise direction. As the sidewall 143a of the input member 142 rotates about axis D, the recess 152 also rotates relative to the tangs 150a and 150b of drive springs 146. As the sidewall 143a rotates, it contacts the second tangs 150b so as to rotate the drive springs 146 in the counterclockwise direction. As each drive spring 146 rotates about axis D, the first tangs 150b rotates within the recesses 154 of the drag cup and abut the sidewall 137a. Because the drag cup 136 moves at a slower angular velocity than that of the input member 142 the first tangs 150a and the second tangs 150b compress toward each other and tighten the drive springs 146 about the mandrel 148 to thereby impart the rotation of the drive shaft 122 to the output member 124.

As described above, the drag spring 134 creates a frictional force between the drag spring 134 and the drag cup 136 to thereby slow the angular velocity of the drag cup 136 relative to the input member 142. Specifically, since the drag cup 136 is disposed within and contacts the drag spring 134, and the drag spring 134 is held in place relative to the static cup 132, the rotational force applied to the drag cup 136 by the first tangs 150a is initially resisted by the drag cup 136 such that a clockwise force is initially applied to the first tangs 150a while a counterclockwise force is applied to second tangs 150b. The counterclockwise force against the second tangs 150b combines with the clockwise force against the first tangs 150a to squeeze the tangs 150a and 150b together to coil and tighten the drive springs 146 about the mandrel 148 and automatically coupling the output member 124 to the motor drive shaft 122. As described above, once the output member 124 and the motor drive shaft 122 are coupled, the first tangs 150a and the second tangs 150b continue to rotate about axis D at a relatively similar angular velocity, such that while the motor 120 actuates, the spring 146 remains in its tightened position about the mandrel 148. Accordingly, as the motor drive shaft 122 rotates, the drive springs 146 coil and tighten about the mandrel 148 such that rotation of the drive shaft 122 causes rotation to the mandrel 148, which in turn causes rotation to the rotary encoder 158 and the output shaft 124 (and belt 14).

As explained above, when the motor 120 ceases counterclockwise actuation of the motor drive shaft 122, the input member 142 and the drag cup 136 stop applying clockwise and counterclockwise forces to the tangs 150a and 150b of drive springs 146, respectively. The drive springs 146 thus lose their potential energy and loosen from the mandrel 148 such that the motor drive shaft 122 is automatically decoupled from the output member.

When the clutch assembly 130 is not driven by the motor 120, the drive springs 146 are in their untightened position about the mandrel and the mandrel 148 is able to slip within the drive springs 146, such that the input member 142 and the drag cup 136 do not rotate. The output member 124, along with the rotary encoder 158 are thus freely rotatable such that the fabric, along with the master car and auxiliary cars 16 and 18 can be manually moved in either direction along the track 12. The rotational encoder 158 can rotate as the fabric is manually moved, so the control system 105 is able to keep track of the position of the drapery fabric whether the output member is manually driven or driven by the motor 120.

When the motor 120 is rotating to move the drapery fabric, the user can pull the drapery fabric in the same direction that the drapery fabric is presently moving, i.e., to overdrive the clutch assembly 130. If the drive springs 146 are tightened (i.e., in the driven state) and the driven mandrel 148 rotates faster in the same direction as the drive springs, the drive springs loosen, such that the driven mandrel is able to slip inside the springs. However, if the drapery fabric is pulled in the opposite direction than the motor 120 is driving the input member 142, the motor 120 can be configured to stall and stop rotating, such that the clutch assembly 130 automatically decouples the motor drive shaft 122 from the output member 124 and the user can pull the drapery fabric in either direction.

While the foregoing description and drawings represent the preferred embodiment of the present invention, it will be understood that various additions, modifications, combinations and/or substitutions can be made therein without departing from the spirit and scope of the invention as defined in the accompanying claims. In particular, it will be clear to those skilled in the art that the invention can be embodied in other specific forms, structures, arrangements, proportions, and with other elements, materials, and components, without departing from the spirit or essential characteristics thereof. One skilled in the art will appreciate that the invention can be used with many modifications of structure, arrangement, proportions, materials, and components, which are particularly adapted to specific environments and operative requirements without departing from the principles of the invention. In addition, features described herein can be used singularly or in combination with other features. For example, features described in connection with one component can be used and/or interchanged with features described in another component. The presently disclosed embodiment is therefore to be considered in all respects as illustrative and not restrictive, the scope of the invention being indicated by the appended claims, and not limited to the foregoing description.

It will be appreciated by those skilled in the art that various modifications and alterations of the invention can be made without departing from the broad scope of the appended claims. Some of these have been discussed above and others will be apparent to those skilled in the art.

What is claimed:

1. A motor drive unit assembly for a motorized shade system having a covering material, the motor drive unit assembly comprising:
   a motor;
   a drive shaft that is operably connected to the motor such that the drive shaft rotates about a drive axis that extends along a first direction;
   an output member that is rotatable about the drive axis, such that rotation of the output member about the drive axis causes the covering material to move;
   a drag cup that includes a body, the drag cup defining a channel that extends into the body along the first direction;
   an input member that is disposed within the channel of the drag cup, the input member having a base that is configured to couple to the drive shaft and a body that extends from the base along the first direction, the body including a sidewall that defines a channel;
   a mandrel coupled to the output member and disposed within the channel of the input member body; and
   a spring disposed about the mandrel, wherein manual actuation of the output member causes the mandrel to rotate about the drive axis relative to the spring such that the output member is disengaged from the drive shaft, and wherein actuation of the drive shaft by the motor causes the input member to rotate relative to the drag cup such that the input member engages the spring to cause the spring to tighten about the mandrel to thereby impart rotation of the drive shaft to the output member.

2. The motor drive unit assembly of claim 1, wherein the drag cup includes a recess that extends into the body from the channel along a direction that is transverse to the first direction, and the body of the input member includes a recess that extends through the sidewall along a direction that is transverse to the first direction such that the recess of the input member at least partially aligns with the recess of the drag cup.

3. The motor drive unit assembly of claim 2, wherein the spring has first and second tangs that extend through the recess of the input member body and into the recess of the drag cup such that rotation of the input member relative to the drag cup causes the first and second tangs to move toward each other and tighten the spring about the mandrel.

4. The motor drive unit assembly of claim 3, further comprising a static cup fixed relative to the motor, the static cup including a body having a sidewall that defines a channel, wherein the drag cup is disposed within the channel of the static cup and friction between the static cup and the drag cup causes the drag cup to initially rotate at a slower angular velocity than the input member when the drive shaft is actuated by the motor.

5. The motor drive unit assembly of claim 4, further comprising a second spring that is disposed about the drag cup, such that friction between the second spring and the drag cup causes the drag cup to initially rotate at a slower angular velocity than the input member when the drive shaft is actuated by the motor.

6. The motor drive unit assembly of claim 5, wherein the body of the static cup defines a recess that extends through the sidewall of the body of the static cup along a direction that is transverse to the first direction, the second spring having a tang that extends into the recess of the static cup body whereby actuation of the drive shaft by the motor causes the tang of the second spring to engage the sidewall of the static cup to thereby expand the second spring so as to allow the drag cup to rotate relative to the second spring.

7. The motor drive unit of claim 4, wherein grease is disposed within the channel of the static cup and about the drag cup, and wherein the grease increases the friction between the static cup and the drag cup when the drive shaft is actuated by the motor.

8. The motor drive unit assembly of claim 3, wherein the first tang is configured to engage the sidewall of the input member and the second tang of the plurality of tangs is configured to engage the body of the drag cup to thereby tighten the spring about the mandrel when the drive shaft is actuated by the motor.

9. The motor drive unit assembly of claim 1, wherein the mandrel has a substantially cylindrical shape.

10. The motor drive unit assembly of claim L further comprising a rotary encoder that is coupled between the output member and the mandrel.

11. The motor drive unit assembly of claim 1, wherein the motor is a reversible motor that includes the drive shaft.

12. The motor drive unit assembly of claim 11, further comprising:
   an electrical circuit having a controller, a transmissive optical sensor circuit, and a motor drive circuit for driving the motor; and
   a rotary encoder coupled to the output member, the rotary encoder functioning with the transmissive optical sensor circuit as a rotational position sensor, so that the controller is operable to track a position of the covering material in response to the transmissive optical sensor circuit.

13. A motor drive unit assembly for a motorized shade system having a covering material, the motor drive unit assembly comprising:
   a motor having a drive shaft;
   an output member rotatable about a drive axis, such that rotation of the output member about the drive axis causes the covering material to move; and
   a clutch assembly that is operatively coupled between the drive shaft of the motor and the output member;
   wherein the clutch assembly is configured to couple the drive shaft to the output member when the motor initiates rotation of the drive shaft in a rotational direction about the drive axis, and to decouple the drive shaft from the output member when the drive shaft ceases rotating in the rotational direction, thereby enabling manual rotation of the output member about the drive axis and manual positioning of the covering material.

14. The motor drive assembly of claim 13, wherein the drive axis extends along a first direction and the clutch assembly comprises:
   a drag cup including a drag cup body, the drag cup further defining a first channel that extends into the drag cup body along the first direction;
   an input member that is disposed within the first channel, the input member having a base that is coupled to the drive shaft of the motor and an input member body that extends from the base along the first direction, the input member body including sidewall that defines a second channel;
   a mandrel that is attached to the output member and that is disposed within the second channel; and
   a spring that is disposed about the mandrel,
   wherein manual actuation of the output member causes the mandrel to rotate about the drive axis relative to the spring such that the output member is disengaged from the drive shaft, and wherein actuation of the drive shaft by the motor causes the input member to rotate relative to the drag cup such that the input member engages the spring to cause the spring to tighten about the mandrel, such that the input member imparts rotation of the drive shaft to the output member.

15. The motor drive assembly of claim 14, wherein the drag cup includes a first recess that extends into the drag cup body from the first channel along a direction that is transverse to the first direction, and the input member body includes a second recess that extends through the sidewall along a direction that is transverse to the first direction such that the second recess at least partially aligns with the first recess.

16. The motor drive assembly of claim 15, wherein the spring has first and second tangs that extend through the second recess and into the first recess, such that rotation of the input member relative to the drag cup causes the first and second tangs to move toward each other and tighten the spring about the mandrel.

17. The motor drive unit assembly of claim 16, further comprising a static cup that is fixed relative to the motor, the static cup including a static cup body having a sidewall that defines a third channel, the drag cup is disposed within the third channel, such that friction between the static cup and the drag cup causes the drag cup to initially rotate at a slower angular velocity than the input member when the drive shaft is actuated by the motor.

18. The motor drive unit assembly of claim 17, further comprising a second spring that is disposed about the drag cup, such that friction between the second spring and the drag cup causes the drag cup to initially rotate at a slower angular velocity than the input member when the drive shaft is actuated by the motor.

19. The motor drive unit assembly of claim 13, further comprising a rotary encoder that is coupled to the output member.

20. A motor drive unit assembly for a motorized shade system having a covering material, the motor drive unit assembly comprising:
   an output member that is rotatable about a drive axis that extends along a first direction, such that rotation of the output member about the drive axis causes the covering material to move;
   a motor having a drive shaft that rotates about the drive axis;
   an input member having a base that is configured to couple to the drive shaft and an input member body that extends from the base along the first direction, the input member body including a sidewall that defines a first channel and a first recess that extends through the sidewall along a second direction that is transverse to the first direction;
   a mandrel that is coupled to the output member and that is configured to rotate about the drive axis, the mandrel disposed within the first channel; and
   a spring that is disposed about the mandrel, the spring having a first configuration wherein the mandrel is rotatable relative to the spring and a second configuration wherein the spring is engaged with the input member and tightened about the mandrel so as to couple the drive shaft to the output member, such that the drive shaft and the output member are rotatable in a first rotational direction about the drive axis or in a second rotational direction about the drive axis that is opposite the first rotational direction.

21. The motor drive unit assembly of claim 20, wherein the mandrel has a substantially cylindrical shape.

22. The motor drive unit assembly of claim 20, wherein rotation of the drive shaft by the motor moves the spring from the first configuration to the second configuration.

23. The motor drive unit assembly of claim 22, further comprising a drag cup that includes a drag cup body, the drag cup defines a second channel that extends into the drag cup body along the first direction, the input member disposed within the second channel such that rotation of the drive shaft by the motor causes the input member to rotate relative to the drag cup, thereby causing the spring to move from the first configuration to the second configuration.

24. The motor drive assembly of claim 23, wherein the drag cup includes a second recess that extends into the drag cup body from the second channel along the second direction such that the first recess at least partially aligns with the recess.

25. The motor drive assembly of claim 24, wherein the spring has first and second tangs that extend through the first recess and into the second recess, such that rotation of the input member relative to the drag cup causes the first and second tangs to move toward each other and tighten the spring about the mandrel.

26. The motor drive unit assembly of claim 25, further comprising a static cup that is fixed relative to the motor, the static cup including a static cup body having a sidewall that defines a third channel, the drag cup is disposed within the third channel, such that friction between the static cup and the drag cup causes the drag cup to initially rotate at a slower angular velocity than the input member when the drive shaft is actuated by the motor.

27. The motor drive unit assembly of claim 26, further comprising a second spring that is disposed about the drag cup, such that friction between the second spring and the drag cup causes the drag cup to initially rotate at a slower angular velocity than the input member when the drive shaft is actuated by the motor.

28. The motor drive unit assembly of claim 20, further comprising a rotary encoder that is coupled to the output member.

29. A motorized drapery system comprising:
   an elongate track configured to be coupled to a structure adjacent a window;
   a belt that is rotatably mounted within the track;
   a car that is positioned within the track such that the car is coupled to the belt, the car being configured to attach to a drapery fabric; and
   a motor drive unit assembly that is operatively coupled to the belt, the motor drive unit assembly including a motor having a drive shaft, an output member that is operably coupled to the belt, and a clutch assembly that is coupled between the drive shaft and the output member,
   wherein the clutch assembly is configured to couple the drive shaft to the output member when the motor initiates rotation of the drive shaft in a rotational direction, and to decouple the drive shaft from the output member when the drive shaft ceases rotating in the rotational direction, such that the drapery fabric can be moved manually.

30. The motorized drapery system of claim 29, wherein the motor drive unit assembly further includes a rotary encoder that is coupled to the output member, the rotary encoder configured to track a position of the car when the output member is rotated manually and when the output member is rotated by the motor.

31. The motorized drapery system of claim 29, wherein the clutch assembly comprises:
   a drag cup including a body, the drag cup further defining a channel that extends into the body along the first direction;

an input member that is disposed within the channel of the drag cup, the input member having a base that is coupled to the drive shaft of the motor and a body that extends from the base along the first direction, the body including a sidewall that defines a channel;

a mandrel that is attached to the output member and that is disposed within the channel of the input member; and a spring that is disposed about the mandrel, wherein manual actuation of the output member causes the mandrel to rotate relative to the spring such that the output member is disengaged from the drive shaft, and wherein actuation of the drive shaft by the motor causes the input member to rotate relative to the drag cup such that the input member engages the spring to cause the spring to tighten about the mandrel, such that the input member imparts rotation of the drive shaft to the output member.

32. A method of moving a covering material of a motorized shade system, the method comprising:

actuating a motor of the motorized shade system to rotate a drive shaft of the motor, wherein rotation of the drive shaft operatively couples an input member attached to the drive shaft to an output member that is operatively coupled to the covering material, such that the input member and the output member rotate together, thereby causing the output member to move the covering material along a first direction; and manually moving the covering material while the motor is rotating the drive shaft, wherein manually moving the covering material causes the output member to disengage from the input member, such that the output member is freely rotatable relative to the input member.

33. The method of claim 32, wherein the motorized shade system includes a spring that operatively couples the input member to the output member via a mandrel that is attached to the output member, and wherein actuating the motor rotates a first tang of the spring about a drive axis defined by the drive shaft at a first angular velocity and rotates a second tang of the spring about the drive axis at a second angular velocity, wherein the first angular velocity is initially faster than the second angular velocity, such that the spring tightens about the mandrel.

34. A clutch assembly for a motor drive unit assembly, the clutch assembly comprising:

an input member that is rotatable about a drive axis, the input member having a base and an input member body that extends from the base along a first direction, the input member body including a sidewall that defines a first channel and a first recess that extends through the sidewall along a second direction that is transverse to the first direction;

a mandrel that is rotatable about the drive axis, the mandrel disposed within the channel of the input member body; and a spring that is disposed about the mandrel, the spring having a first configuration wherein the mandrel is rotatable relative to the spring and a second configuration wherein the spring is engaged with the input member and tightened about the mandrel so as to couple the input member to the mandrel for rotation of the mandrel and the input member in a first rotational direction about the drive axis or in a second rotational direction about the drive axis that is opposite the first rotational direction.

35. The clutch assembly of claim 34, wherein rotation of the input member moves the spring from the first configuration to the second configuration.

36. The clutch assembly of claim 34, further comprising a drag cup that includes a drag cup body, the drag cup defines a second channel that extends into the drag cup body along the first direction, the input member is disposed within the second channel such that rotation of the input member relative to the drag cup causes the spring to move from the first configuration to the second configuration.

37. The clutch assembly of claim 36, wherein the drag cup includes a second recess that extends into the drag cup body from the second channel along the second direction such that the first recess at least partially aligns with the second recess.

38. The clutch assembly of claim 37, wherein the spring has first and second tangs that extend through the first recess body and into the second recess, such that rotation of the input member relative to the drag cup causes the first and second tangs to move toward each other and tighten the spring about the mandrel.

39. The clutch assembly of claim 38, further comprising a static cup that is fixed relative to the mandrel, the input member, and the drag cup, the static cup including a static cup body having a sidewall that defines a third channel, the drag cup is disposed within the third channel, such that friction between the static cup and the drag cup causes the drag cup to initially rotate at a slower angular velocity than the input member when the input member is rotated.

40. The clutch assembly of claim 39, further comprising a second spring that is disposed about the drag cup, such that friction between the second spring and the drag cup causes the drag cup to initially rotate at a slower angular velocity than the input member when the input member is rotated.

41. The method of claim 32, wherein the motorized shade system includes a clutch assembly that operatively couples the input member to the output member, wherein manually moving the covering material in the first direction overdrives the clutch assembly, such that the clutch assembly disengages the output member from the input member, and wherein manually moving the covering material in a second direction that is opposite the first direction causes the motor to cease rotating the drive shaft, such that the clutch assembly disengages the output member from the input member.

* * * * *